(12) United States Patent
Takizawa et al.

(10) Patent No.: US 7,843,698 B2
(45) Date of Patent: Nov. 30, 2010

(54) ELECTRONIC APPARATUS AND ENCLOSURE

(75) Inventors: Tomohiro Takizawa, Kawasaki (JP);
Kiyohiko Ikeda, Kawasaki (JP);
Makoto Tsuchida, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 334 days.

(21) Appl. No.: 11/651,015

(22) Filed: Jan. 9, 2007

(65) Prior Publication Data
US 2007/0107923 A1 May 17, 2007

Related U.S. Application Data

(63) Continuation of application No. PCT/JP2004/011891, filed on Aug. 19, 2004.

(51) Int. Cl.
*H05K 5/00* (2006.01)
(52) U.S. Cl. .................. 361/732; 361/801; 361/802
(58) Field of Classification Search .............. 361/752, 361/790, 797, 800, 801, 802, 754, 759, 740, 361/732, 726, 747; 312/223, 223.1, 223.2
See application file for complete search history.

(56) References Cited

U.S. PATENT DOCUMENTS

| | | | | |
|---|---|---|---|---|
| 5,671,274 A | * | 9/1997 | Kotaka | 379/433.12 |
| 5,721,669 A | * | 2/1998 | Becker et al. | 361/685 |
| 5,769,710 A | * | 6/1998 | Kim | 454/324 |
| 5,924,780 A | * | 7/1999 | Ammon et al. | 312/223.2 |
| 6,381,146 B1 | | 4/2002 | Sevier | |
| 6,398,327 B1 | * | 6/2002 | Momoze | 312/319.1 |
| 6,929,338 B2 | * | 8/2005 | Chang | 312/223.2 |
| 6,947,280 B2 | * | 9/2005 | Li | 361/679.46 |
| 6,952,341 B2 | | 10/2005 | Hidaka et al. | |
| 7,242,589 B1 | * | 7/2007 | Cheng et al. | 361/735 |
| 7,379,303 B2 | * | 5/2008 | Miyamura et al. | 361/715 |
| 2001/0022758 A1 | * | 9/2001 | Howard | 368/10 |
| 2005/0173276 A1 | * | 8/2005 | Hsu | 206/320 |

FOREIGN PATENT DOCUMENTS

| | | |
|---|---|---|
| DE | 7529370 | 1/1976 |
| DE | 101 13 688 | 9/2002 |
| DE | 101 55 502 | 5/2003 |

(Continued)

OTHER PUBLICATIONS

International Search Report of International Application PCT/JP2004/011891 (mailed on Nov. 2, 2004.

(Continued)

*Primary Examiner*—Hung S Bui
(74) *Attorney, Agent, or Firm*—Staas & Halsey LLP (57) ABSTRACT

A cover is coupled to an enclosure body for a relative sliding movement. An opening operating member is attached to the enclosure body. An enclosure includes a sliding mechanism for sliding the cover. When the cover is to be removed, a user operates the opening operating member so as to cause the cover to slide. The user can thus recognize the movable portion of the enclosure. At the same time, the user can recognize the direction of movement of the movable portion, that is, the cover. Even the user who does not remember the operation of releasing can carry out the operation to remove the cover with small force and relatively easily.

8 Claims, 6 Drawing Sheets

FOREIGN PATENT DOCUMENTS

| | | |
|---|---|---|
| EP | 0 799 747 A2 | 10/1997 |
| JP | 6-209173 | 7/1994 |
| JP | 6-60980 | 8/1994 |
| JP | 9-282858 | 10/1997 |
| JP | 11-150382 | 6/1999 |
| JP | 2001-339173 | 12/2001 |
| JP | 2002-185155 | 6/2002 |
| JP | 2004-54967 | 2/2004 |

OTHER PUBLICATIONS

Office Action issued in corresponding German Patent Application No. 112004002924.4 on Nov. 29, 2007.

PCT International Preliminary Report on Patentability, mailed Mar. 1, 2007, and issued in corresponding International Application No. PCT/JP2004/011891 with Notice of Transmittal cover page.

Communication from the Japanese Patent Office mailed on Aug. 25, 2009 in the related Japanese Application No. 2006-531118.

JP 6-60980, JP 2001-339173, and JP 9-282858 (References AG-AI) were cited in a Japanese Office Action (Reference BE) mailed May 25, 2010 in corresponding Japanese Patent Application No. 2006-531118.

JP 9-282858 (Reference AI) corresponds to EP 0 799 747 A2 (Reference AJ).

Japanese Office Action mailed May 25, 2010 in corresponding Japanese Patent Application No. 2006-531118.

* cited by examiner

ELECTRONIC APPARATUS AND ENCLOSURE

CROSS REFERENCE TO RELATED APPLICATIONS

This application is a continuing application, filed under 35 U.S.C. §111(a), of International Application PCT/JP2004/011891, filed Aug. 19, 2004, the disclosures of which are hereby incorporated herein by reference.

BACKGROUND OF THE INVENTION

1. Field of the Invention

The present invention relates to an electronic apparatus such as a desktop personal computer. In particular, the invention relates to an enclosure defining an inner space.

2. Description of the Prior Art

Generally, a desktop computer includes an enclosure body and a cover coupled to the enclosure body. An electronic component such as a hard disk drive (HDD) is placed within the inner space defined between the enclosure body and the cover. Each of the enclosure body and the cover is an assembly of components. A plurality of boundaries thus appear on the exterior of the computer in addition to the boundary between the enclosure body and the cover.

When an electronic component is replaced, the cover is removed from the enclosure body. However, the user of the computer hardly finds the boundary between the movable portion and the stationary portion out of the plurality of boundaries. Moreover, it is difficult for the user to recognize the release direction of the movable portion based on the boundary. The user must work on the release of the cover through a trial and error. The user suffers from a troublesome operation of removing the cover.

SUMMARY OF THE INVENTION

It is accordingly an object of the present invention to provide an enclosure and an electronic apparatus capable of releasing a cover with small force and relatively easily.

According to a first aspect of the present invention, there is provided an enclosure including: an enclosure body; a cover slidably coupled to the enclosure body, the cover defining the inner space between the enclosure body and the cover itself; an opening operating member attached to the enclosure body; and a sliding mechanism causing the cover to slide based on the operation of the opening operating member.

When the cover is to be removed in the enclosure, the user operates the opening operating member. The operation of the opening operating member causes the cover to slide. The user can thus recognize the movable portion of the enclosure. At the same time, the user can recognize the direction of movement of the movable portion, that is, the cover. Even the user who does not remember the operation of releasing the cover can carry out the operation of releasing the cover with small force and relatively easily.

The cover may be allowed to move from a closing position to a release position. The cover at the closing position is designed to close an opening defined in the enclosure body. The cover at the release position is released from the enclosure body. The opening operating member is designed to stop the cover at a position between the closing position and the release position.

The operation of the opening operating member allows at least the user to recognize the direction of movement of the movable portion, that is, the cover. When the user then causes the cover to move to the release position, the cover can easily be released from the enclosure body. When the cover is stopped at a position between the closing position and the release position, engagement may be maintained between the enclosure body and the cover.

The sliding mechanism may cause the cover to move in accordance with the degree of operation of the opening operating member. The user can thus control the amount of movement of the cover based on the degree of operation of the opening operating member. An indicator may be attached to the opening operating member. The indicator allows the user to recognize the opening operating member as an opening operating member of the enclosure.

The aforementioned enclosure may be employed in an electronic apparatus, for example. In this case, the electronic apparatus may comprise: an enclosure body; a cover slidably coupled to the enclosure body, the cover defining the inner space between the enclosure body and the cover itself; an opening operating member attached to the enclosure body; and a sliding mechanism causing the cover to slide based on the operation of the opening operating member.

The cover may likewise be allowed to move from a closing position to a release position, the cover at the closing position designed to close an opening defined in the enclosure body, the cover at the release position being released from the enclosure body, the opening operating member designed to stop the cover at a position between the closing position and the release position. The sliding mechanism may cause the cover to move in accordance with the degree of operation of the opening operating member. An indicator may be attached to the opening operating member.

BRIEF DESCRIPTION OF THE DRAWINGS

The above and other objects, features and advantages of the present invention will become apparent from the following description of the preferred embodiment in conjunction with the accompanying drawings, wherein.

DESCRIPTION OF THE PREFERRED EMBODIMENT

Figure 1:
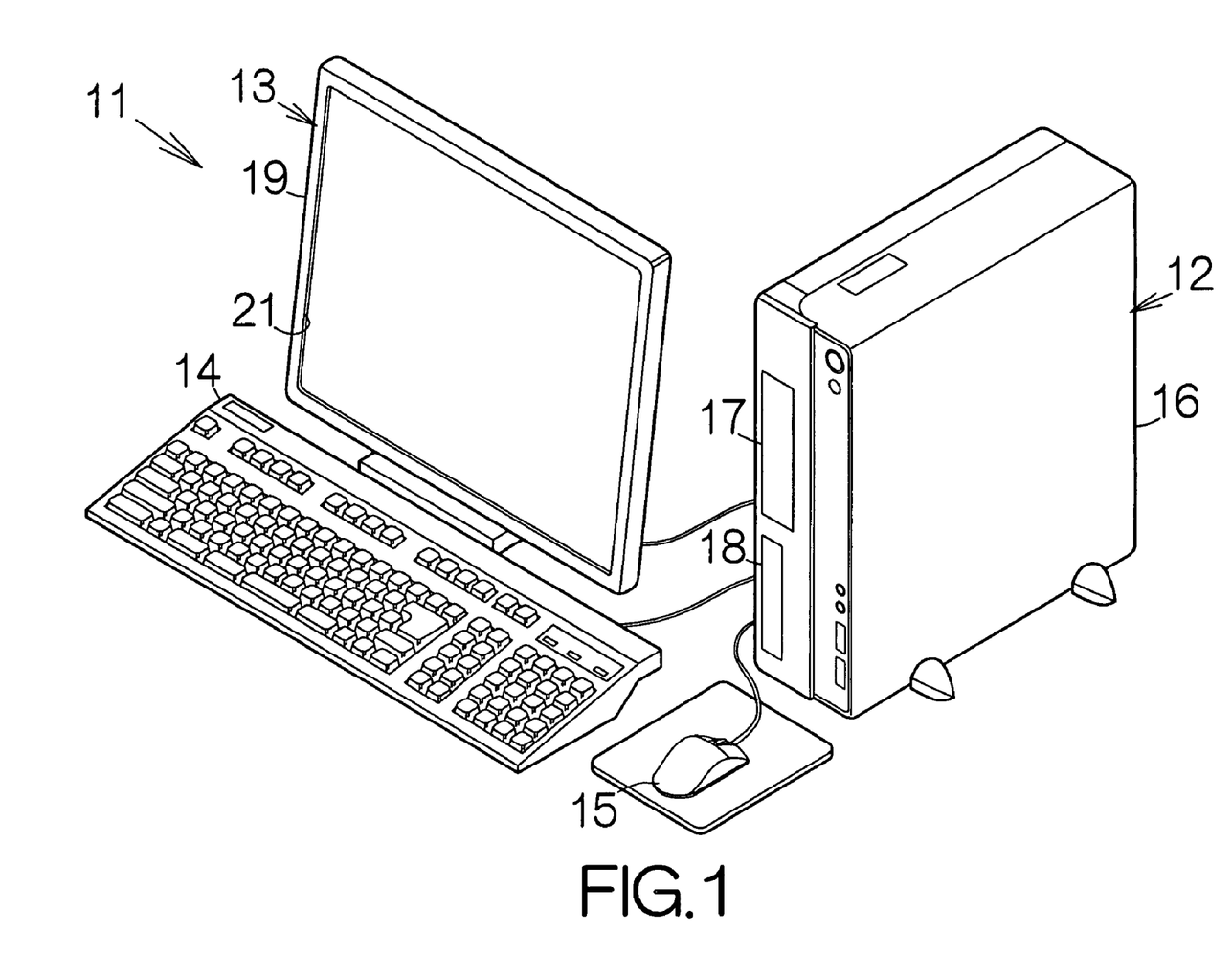
FIG. 1 is a perspective view schematically illustrating the structure of a desktop computer system as a specific example of an electronic apparatus.

FIG. 1 is a perspective view schematically illustrating the structure of a desktop computer system 11 as a specific example of an information processing apparatus. The desktop computer system 11 includes a computer 12 as an example of an electronic apparatus and a display apparatus 13 connected to the computer 12. Input devices such as a keyboard 14, a mouse 15 and the like are also connected to the computer 12.

The computer 12 includes a box-shaped enclosure 16. A so-called motherboard is enclosed in the enclosure 16. As conventionally known, electronic circuit elements such as a CPU (central processing unit), a memory, and the like, are mounted on the motherboard. The central processing unit executes various processing and calculation based on software programs and data temporarily stored in the memory, for example. The software programs and data may be stored in a mass storage such as a hard disk drive (HDD) likewise enclosed within the enclosure 16. The user is allowed to input various data and instructions to the central processing unit through the keyboard 14 and the mouse 15.

A FDD (flexible disk drive) 17, a recording disk drive 18 for a recording disk such as a CD and a DVD, and the like, are also enclosed in the enclosure 16. The flexible disk drive 17 and the recording disk drive 18 are allowed to receive a diskette (FD), a CD-ROM, a DVD-ROM, and the like, through front openings, respectively. The flexible disk drive 17 and the recording disk drive 18 are allowed to read out data or/and software programs out of the diskette and the CD-ROM or DVD-ROM thus received, for example.

The display apparatus 13 includes a display enclosure 19. A flat display panel such as a liquid crystal display (LCD) panel is enclosed in the display enclosure 19, for example. A rectangular window 21 is defined in the display enclosure 19. A display screen of the LCD panel is exposed inside the window 21. Various graphics and/or texts are displayed on the display screen of the LCD panel based on the operation of the central processing unit.

Figure 2:
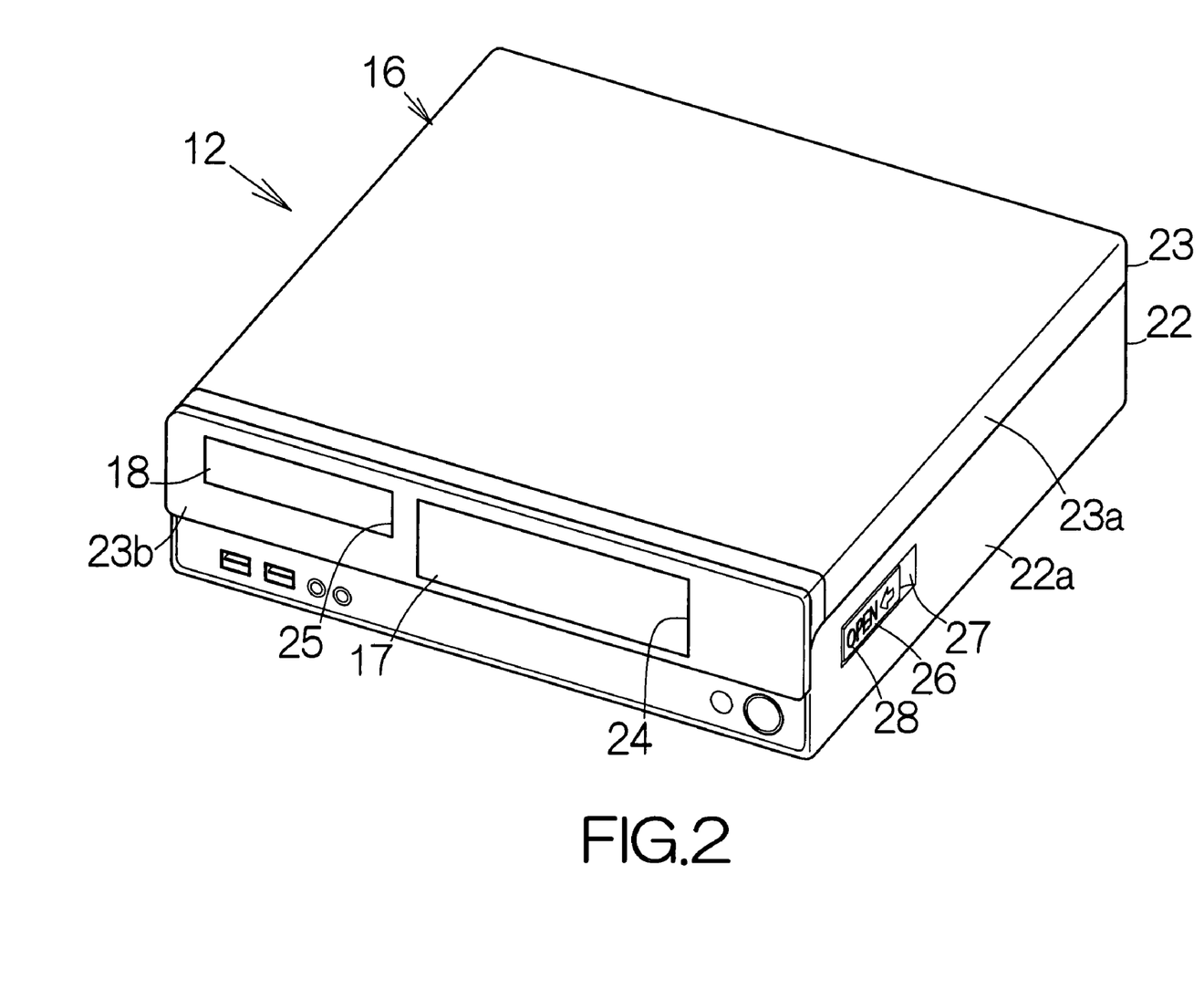
FIG. 2 is a perspective view schematically illustrating the structure of a computer.

As shown in FIG. 2, the enclosure 16 of the computer 12 includes an enclosure body 22, and a cover 23 defining an inner space between the enclosure body 22 and the cover 23. The cover 23 is coupled to the enclosure body 22 for sliding movement in the longitudinal direction of the enclosure 16 based on a guiding mechanism and a sliding mechanism, as described later in detail. Here, the lower end of a side wall 23a of the cover 23 is coupled to the upper end of a side wall 22a of the enclosure body 22. The enclosure body 22 and the cover 23 may be made of a metallic material such as aluminum or a resin material.

Openings 24, 25 are defined in the front panel 23b of the cover 23 for receiving the flexible disk drive 17 and the recording disk drive 18, respectively. The front panel 23b may be fixed to the cover 23, for example. The front panel 23b may be molded from a resin material, for example.

An opening lever 26 as an example of an opening operating member is attached to the side wall 22a of the enclosure body 22. Here, two opening levers 26 may be arranged in both the side walls 22a, 22a, for example. The opening lever 26 may be formed in a plate shape. The opening lever 26 is received within a recess 27 formed in the side wall 22a. The cover 23 is allowed to slide in response to the operation of the opening lever 26. The sliding movement of the cover 23 will be described later in detail.

An indicator 28 is attached to the outward surface of the opening lever 26. The indicator 28 includes characters such as "OPEN" in English or Japanese, an arrow indicating the direction of movement of the opening lever 26, an arrow indicating the direction of sliding movement of the cover 23, and the like. The indicator 28 allows the user to recognize the opening lever 26 as an opening lever of the enclosure 16. Alternatively, the indicator 28 may be attached to the side wall 22a of the enclosure body 22, for example.

Figure 3:
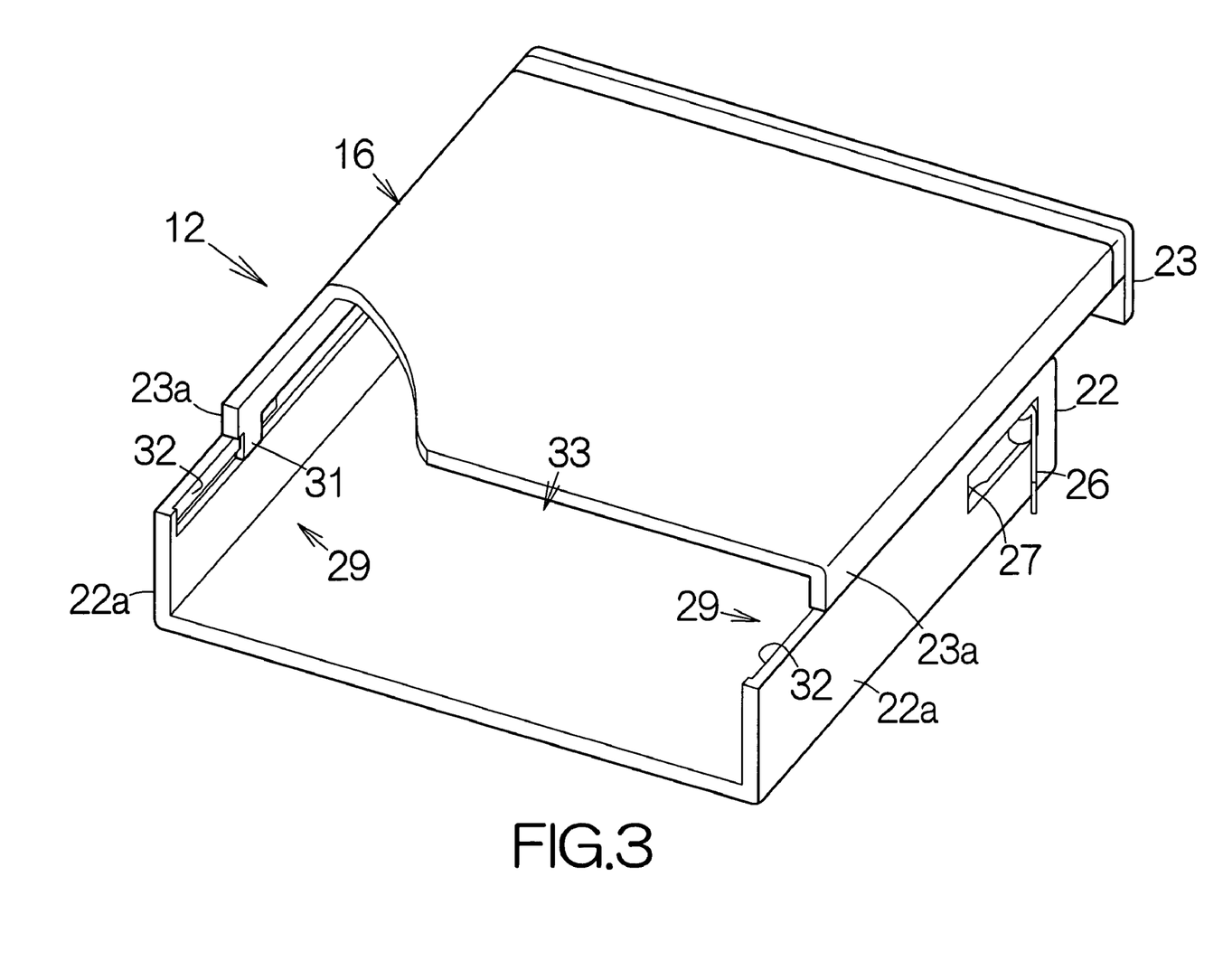
FIG. 3 is perspective view schematically illustrating the structure of a guiding mechanism.

A guiding mechanism 29, as shown in FIG. 3, for example, is established on the enclosure body 22 and the cover 23. The guiding mechanism 29 includes a pair of sliding members 31, 31 each protruding from the side wall 23a of the cover 23 toward the enclosure body 22. The sliding members 31, 31 maybe disposed adjacent the rear end of the cover 23. The sliding member 31, 31 may be integral to the cover 23.

On the other hand, projections 32, 32 are formed on the inner surfaces of the side walls 22a of the enclosure body 22. The projections 32, 32 project inward from the inner surfaces of the side walls 22a, respectively. The projection 32 extends forward in the enclosure 16. The projections 32 end up in the middle of the way. The sliding member 31 can move along the projection 32 in the longitudinal direction of the enclosure 16. When the sliding members 31, 31 are respectively engaged with the projections 32, 32, the cover 23 is coupled to the enclosure body 22.

The sliding members 31, 31 and the projections 32, 32 allow the cover 23 to slide forward in the enclosure 16. The sliding movement of the cover 23 enables establishment of an opening 33 in the enclosure body 22. When the sliding members 31, 31 are disengaged from the projections 32, 32 based on the sliding movement of the cover 23, the cover 23 can be removed upward from the enclosure body 22.

Figure 4:
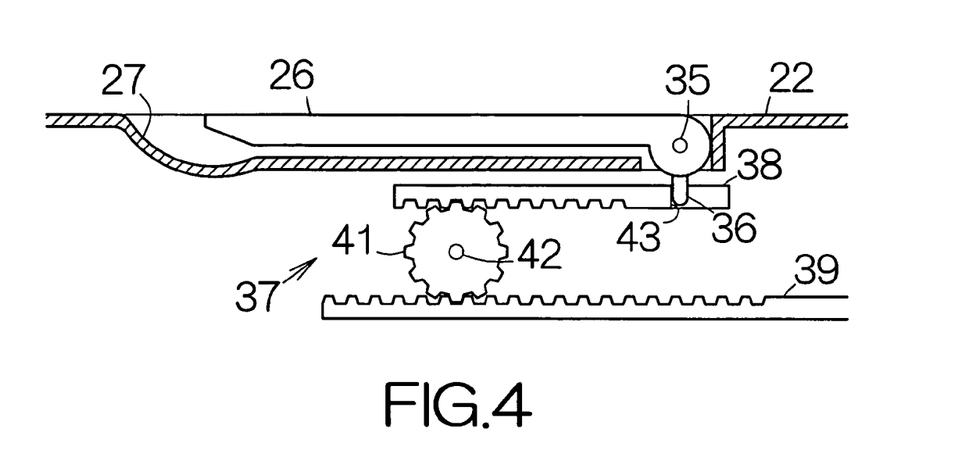
FIG. 4 is an enlarged partial sectional view schematically illustrating the structure of a sliding mechanism.

As shown in FIG. 4, the opening lever 26 is pivotably supported on a support shaft 35 standing from the enclosure body 22 in the vertical direction. The opening lever 26 is thus allowed to pivot between a received position and a pullout position. The opening lever 26 at the received position is received within the recess 27. The opening lever 26 at the pullout position gets out of the recess 27 by a maximum amount. A plate piece 36 is formed on the opening lever 26. The plate piece 36 protrudes inward from the support shaft 35 in the horizontal direction. The opening lever 26 and the plate piece 36 may be integrally molded from a metallic material such as aluminum or a resin material.

A sliding mechanism 37 is related to the plate piece 36 of the opening lever 26 in the inner space of the enclosure 16. The sliding mechanism 37 includes first and second rack 38 and a gear 41. The first rack 38 is attached to the enclosure body 22 for movement in the longitudinal direction of the enclosure 16. The second rack 38 is fixed to the cover 23. A gear 41 is interposed between the first and second racks 38, 39. The gear 41 is rotatably supported on a support shaft 42 standing upright from the enclosure body 22 in the vertical direction.

The first and second racks 38, 39 are provided with a plurality of teeth at a predetermined pitch on the surfaces opposed to each other. The teeth engage with teeth defined in the gear 41. The torque of the gear 41 is transmitted to the first and second racks 38, 39. The rotation of the gear 41 causes the first and second racks 38, 39 to linearly move in the opposite directions. Here, the movement of the first and second racks 38, 39 is defined parallel to the side wall 22a of the enclosure body 22. A receiving surface 43 is defined in the first rack 38 for receiving the plate piece 36 of the opening lever 26. The receiving surface 43 is defined parallel to the front panel 23b of the cover 23.

Next, assume that the user of the desktop computer system 11 removes the cover 23 from the computer 12. During the operation of the computer 12, as shown in FIG. 2, the cover 23 is located at a closing position or a first position. The cover 23 at the closing position is designed to maintain the engagement between the cover 23 and the enclosure body 22, for example. The cover 23 at the closing position serves to close the opening 33 of the enclosure body 22. The opening lever 26 is positioned at the received position, as shown in FIG. 4, for example. The plate piece 36 of the opening lever 26 is received on the receiving surface 43 of the first rack 38. A locking mechanism may be formed in the enclosure 16, for example, to maintain the engagement between the enclosure body 22 and the cover 23.

Figure 5:
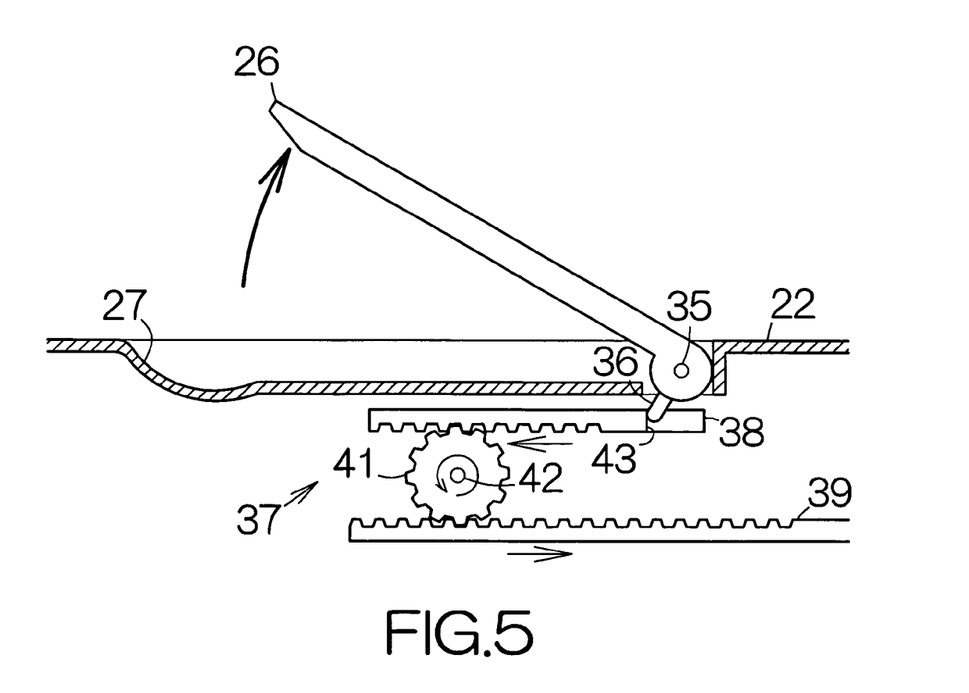
FIG. 5 is an enlarged partial sectional view schematically illustrating a state where an opening lever is pulled out.

When the opening lever 26 is pulled out, for example, as shown in FIG. 5, the opening lever 26 pivots toward the pullout position. The swinging movement of the opening lever 26 causes the plate piece 36 to pivot around the support shaft 35. The receiving surface 43 receives the driving power of the swinging plate piece 36. The first rack 38 is driven backward in the enclosure 16. The first rack 38 is thus caused to move backward. The first rack 38 causes the gear 41 to rotate in a normal direction. The rotation of the gear 41 serves to urge the second rack 39 forward in the enclosure 16. The second rack 39 is caused to move forward. The sliding members 31, 31 thus move along the projections 32, 32. The lower end of the side wall 23a of the cover 23 slides on the upper end of the side wall 22a of the enclosure body 22. The cover 23 thus slides forward on the enclosure 16.

Figure 6:
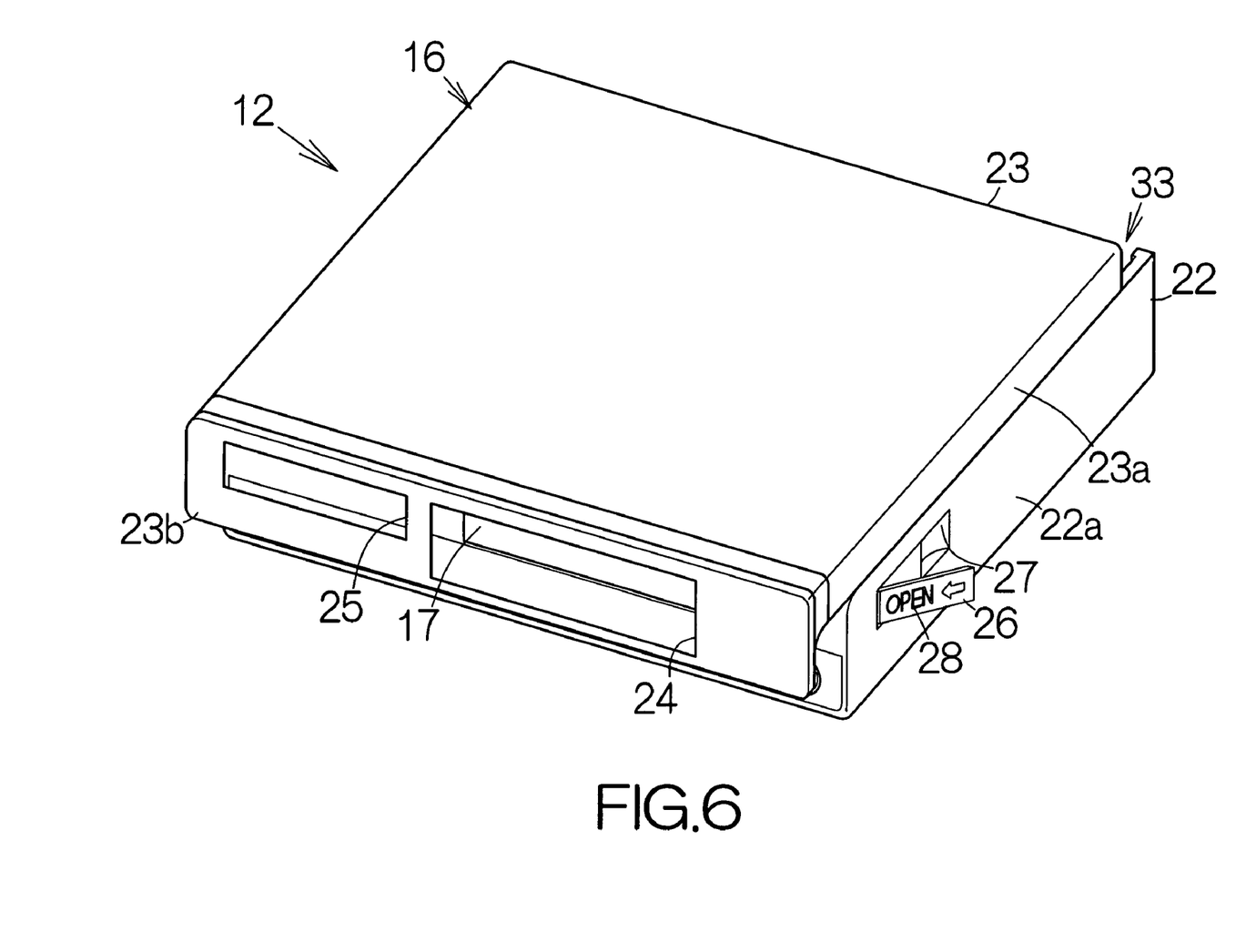
FIG. 6 is a perspective view schematically illustrating a state where the cover is caused to slide.

When the opening lever 26 is positioned at the pullout position, the driving power of the plate piece 36 of the opening lever 26 fails to act on the receiving surface 43 of the first rack 38. The cover 23 cannot slide any further. For example, as shown in FIG. 6, the cover 23 thus stops at a second position to open a part of the opening 33 of the enclosure body 22. The cover 23 at the second position keeps engaging with the enclosure body 22. The sliding member 31 of the cover 23 may be engaged with the projection 32, for example.

Here, the plate piece 36 of the opening lever 26 is received on the receiving surface 43 of the first rack 38 when a driving force is transmitted. As a result, the driving force of the opening lever 26 is directly transmitted to the receiving surface 43. The driving force transmitted to the receiving surface 43 is also transmitted to the cover 23 through the gear 41 and the second rack 39. Accordingly, as long as the driving force of the opening lever 26 is transmitted to the receiving surface 43, the cover 23 is caused to move in accordance with the degree of operation, that is, the pullout amount of the opening lever 26. The user can thus control the amount of movement of the cover 23 based on the pullout amount of the opening lever 26.

Figure 7:
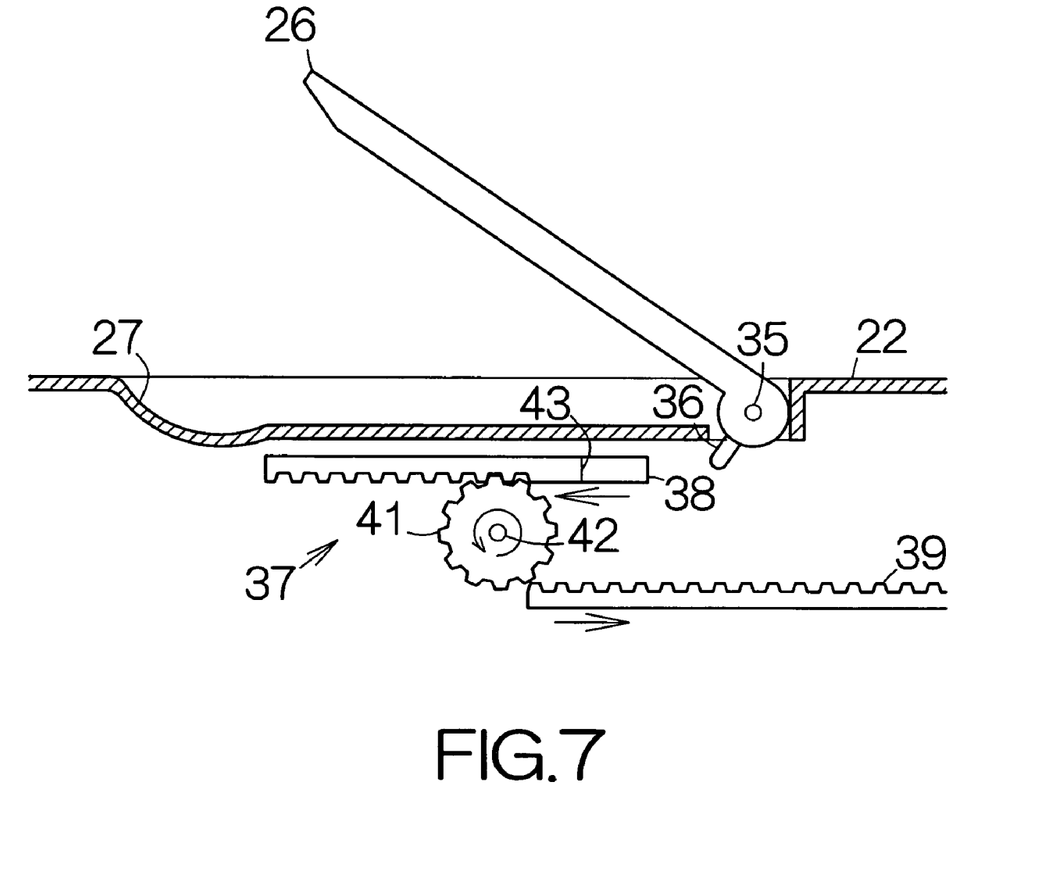
FIG. 7 is an enlarged partial sectional view schematically illustrating a state where the opening lever is pulled out at a pullout position.

When the user then pulls the cover 23 further forward in the enclosure 16, the receiving surface 43 is released from the plate piece 36 of the opening lever 26. When the cover 23 is further pulled forward, the second rack 39 is released from the gear 41, for example, as shown in FIG. 7. At the same time, the sliding member 31 of the cover 23 is released from the projection 32. The cover 23 is thus positioned at a release position or a third position. The cover 23 at the release position is disengaged from the enclosure body 22. The user can lift the cover 23 from the enclosure body 22 in the vertical direction at the third position. Otherwise, the cover 23 may be completely pulled out forward. The cover 23 can thus be removed from the enclosure body 22.

When the user pulls the opening lever 26 toward the pullout position in the aforementioned computer 12, the cover 23 is caused to slide forward in the enclosure 16. The user can thus recognize the movable portion of the enclosure 16. At the same time, the user can recognize the direction of movement of the movable portion, that is, the cover 23. When the user then further pulls the cover 23 in the direction of movement of the cover 23, the cover 23 can be released from the enclosure body 22. Accordingly, even the user who does not remember the operation of releasing the cover 23 can carry out the operation to release the cover 23 with small force and relatively easily.

When the cover 23 is to be attached, the user first superposes the lower end of the side wall 23a of the cover 23 on the upper end of the side wall 22a of the enclosure body 22. The user then causes the cover 23 to slide backward in the enclosure 16. The second rack 39 on the cover 23 thus engages with the gear 41. When the cover 23 is further caused to slide backward, the second rack 39 causes the gear 41 to rotate in the reverse direction opposite to the normal direction. The torque of the gear 41 is transmitted to the first rack 38. The first rack 38 is caused to move forward. The receiving surface 43 of the first rack 38 receives the plate piece 36 of the opening lever 26. When the first rack 38 is further caused to move forward, the receiving surface 43 causes the plate piece 36 to pivot around the support shaft 35. The opening lever 26 pivots from the pullout position toward the received position. When the cover 23 is positioned at the first position, the opening lever 26 is received within the recess 27. Engagement can be established between the enclosure body 22 and the cover 23.

The aforementioned enclosure 16 may be employed not only in the computer 12 but also in any type of electronic apparatus such as a notebook personal computer, a printer, a scanner, a display apparatus, a disk array apparatus, and the like.

What is claimed is:

1. An enclosure comprising:
    an enclosure body;
    a cover slidably coupled to the enclosure body, the cover defining an inner space between the enclosure body and the cover itself;
    an opening operating member attached to the enclosure body and exposed at an outer surface of the enclosure body; and
    a sliding mechanism causing the cover to slide based on an operation of the opening operating member, wherein
    the cover is configured to move from a closing position toward a release position in response to the operation of the opening operating member, the cover taking the closing position to close an opening defined in the enclosure body, the cover taking the release position to be released from the enclosure body.

2. The enclosure according to claim 1, wherein the opening operating member is configured to stop the cover at a position between the closing position and the release position.

3. The enclosure according to claim 1, wherein the sliding mechanism causes the cover to move in accordance with the degree of operation of the opening operating member.

4. The enclosure according to claim 1, wherein an indicator is attached to the opening operating member.

5. An electronic apparatus comprising:
    an enclosure body;
    a cover slidably coupled to the enclosure body, the cover defining an inner space between the enclosure body and the cover itself;
    an opening operating member attached to the enclosure body and exposed at an outer surface of the enclosure body; and
    a sliding mechanism causing the cover to slide based on an operation of the opening operating member, wherein
    the cover is configured to move from a closing position toward a release position in response to the operation of the opening operating member, the cover taking the closing position to close an opening defined in the enclosure body, the cover taking the release position to be released from the enclosure body.

6. The electronic apparatus according to claim 5, wherein the opening operating member is configured to stop the cover at a position between the closing position and the release position.

7. The electronic apparatus according to claim 5, wherein the sliding mechanism causes the cover to move in accordance with the degree of operation of the opening operating member.

8. The electronic apparatus according to claim 5, wherein an indicator is attached to the opening operating member.

* * * * *